US012807822B2

(12) United States Patent
Bastos et al.

(10) Patent No.: US 12,807,822 B2
(45) Date of Patent: Nov. 24, 2026

(54) PAINT COATING FORMULATION AND THEIR USES

(71) Applicant: WEG TINTAS LTDA, Guaramirim (BR)

(72) Inventors: Thiago Elias Bastos, Joinville (BR); Luis Augusto Knis, Schroeder (BR); Diovana Manuela Ockner, Guaramirim (BR)

(73) Assignee: WEG TINTAS LTDA, Guaramirim (BR)

( * ) Notice: Subject to any disclaimer, the term of this patent is extended or adjusted under 35 U.S.C. 154(b) by 0 days.

(21) Appl. No.: 19/150,441

(22) PCT Filed: Jan. 3, 2024

(86) PCT No.: PCT/BR2024/050001
§ 371 (c)(1),
(2) Date: Jul. 23, 2025

(87) PCT Pub. No.: WO2024/159283
PCT Pub. Date: Aug. 8, 2024

(65) Prior Publication Data
US 2026/0217985 A1 Jul. 30, 2026

Related U.S. Application Data

(60) Provisional application No. 63/482,914, filed on Feb. 2, 2023.

(51) Int. Cl.
*C09D 5/08* (2006.01)
*C09D 7/20* (2018.01)
(Continued)

(52) U.S. Cl.
CPC ................ *C09D 5/08* (2013.01); *C09D 7/20* (2018.01); *C09D 7/41* (2018.01); *C09D 7/42* (2018.01);
(Continued)

(58) Field of Classification Search
CPC ... C09D 5/08; C09D 7/65; C09D 7/61; C09D 7/20; C09D 7/43; C09D 7/63; C09D 7/66;
(Continued)

(56) References Cited

U.S. PATENT DOCUMENTS 6,992,126 B2 * 1/2006 Miranda .................. C08K 3/22 524/430
2009/0068473 A1 3/2009 Van Wessel et al.
(Continued)

FOREIGN PATENT DOCUMENTS

CN 106519899 A 3/2017
CN 108822690 A 11/2018
(Continued)

OTHER PUBLICATIONS

International Search Report and Written Opinion for Corresponding International Application No. PCT/BR2024/050001, 9 pages, Mar. 26, 2024.

*Primary Examiner* — Robert S Walters, Jr.
(74) *Attorney, Agent, or Firm* — LUCAS & MERCANTI, LLP

(57) ABSTRACT

A water-soluble epoxy paint coating, wherein the addition of niobium oxide nanoparticles allowed the development of a coating with high anticorrosive performance, applied in low film thickness and with a single coat. The present paint coating is used for application on metallic substrates, focusing on auto parts of vehicles in general, preferably brake discs, drum blocks and brake drums.

16 Claims, 1 Drawing Sheet

A B

(51) Int. Cl.

| | |
|---|---|
| ***C09D 7/40*** | (2018.01) |
| ***C09D 7/41*** | (2018.01) |
| ***C09D 7/42*** | (2018.01) |
| ***C09D 7/43*** | (2018.01) |
| ***C09D 7/61*** | (2018.01) |
| ***C09D 7/63*** | (2018.01) |
| ***C09D 7/65*** | (2018.01) |
| ***C09D 163/00*** | (2006.01) |
| *C08K 3/22* | (2006.01) |
| *C08K 3/28* | (2006.01) |
| *C08K 3/36* | (2006.01) |
| *C08K 5/00* | (2006.01) |
| *C08K 5/17* | (2006.01) |

(52) U.S. Cl.

CPC ................. *C09D 7/43* (2018.01); *C09D 7/61* (2018.01); *C09D 7/63* (2018.01); *C09D 7/65* (2018.01); *C09D 7/66* (2018.01); *C09D 163/00* (2013.01); *C08K 3/22* (2013.01); *C08K 3/28* (2013.01); *C08K 3/36* (2013.01); *C08K 5/0041* (2013.01); *C08K 5/17* (2013.01); *C08K 2201/011* (2013.01)

(58) Field of Classification Search

CPC .......... C09D 7/41; C09D 163/00; C08K 3/22; C08K 3/28; C08K 3/36; C08K 5/0041; C08K 5/17; C08K 2201/011

See application file for complete search history.

(56) References Cited

U.S. PATENT DOCUMENTS

| | | | |
|---|---|---|---|
| 2010/0297357 | A1 | 11/2010 | Mowrer et al. |
| 2020/0048475 | A1 | 2/2020 | Kalsani et al. |
| 2021/0363358 | A1 | 11/2021 | Mayo et al. |

FOREIGN PATENT DOCUMENTS

| | | | |
|---|---|---|---|
| CN | 109897532 | A | 6/2019 |
| WO | 2002072712 | A1 | 9/2002 |
| WO | 2022186885 | A1 | 9/2022 |

* cited by examiner

PAINT COATING FORMULATION AND THEIR USES

CROSS-REFERENCE TO RELATED APPLICATIONS

This application is a 371 of PCT/BR2024/050001, filed Jan. 3, 2024, which claims the benefit of priority from U.S. Provisional Application No. 63/482,914, filed Feb. 2, 2023, the contents of each of which are incorporated herein by reference.

FIELD OF INVENTION

The present invention falls within the field of nanotechnology, more precisely in the area of paints and coatings using such technology and refers to a water-soluble epoxy paint coating for application on metallic substrates, focusing on auto parts of vehicles in general, preferably brake discs, drum blocks and brake drums. The coating provides high anti-corrosive protection to the substrate, a property improved with the addition of the nanomaterial.

BACKGROUND OF INVENTION

There are some technologies on the market with the same purpose as the present invention, for example, coatings containing toxic organic solvents in the composition. However, the application of a water-based paint has the advantage of being non-toxic, not emitting volatile organic compounds and complying with several legislations related to chemical products.

Acrylic paints have also been used for this purpose, but the anticorrosive performance is much lower, generally not resisting more than 500 hours in the neutral salt spray test without showing corrosion and blistering on the film. Another applied technology is electrocoating (e-coat), but it requires the assembly of a specific application line, and the costs associated with the assembly and maintenance of the line are high.

The addition of niobium oxide nanoparticles allowed the development of a water-soluble coating with high anti-corrosion performance, even when applied in low film thickness and with a single coat, which allows for higher yields of the material and a faster application process. As it is water-based, it also does not contain toxic organic solvents in its composition. The product showed high resistance to the neutral salt spray test after 1000 hours of exposure.

PRIOR ARTS

Document WO2002072712A1 refers to compositions and coatings, having the niobium, its oxides and possible associations with other oxides as a pigment, and its utilization carried out by the usual techniques of painting, acting as an anticorrosive to organic acids, particularly the naphthenic acids in sulfide medium, persistently present in the petrochemical industry. However, this document uses high levels of niobium oxide (30-40%) to ensure anticorrosive performance. On the other hand, the product proposed in the present invention introduces much smaller amounts of the material, and on a nanoscale, so that only small amounts of the particles are sufficient to guarantee high anticorrosive performance of the invention.

Document CN109897532 discloses a graphene coating material used for prevention of boiler four tube high temperature corrosion, and a preparation method thereof. The graphene coating material used for prevention of boiler four tube high temperature corrosion comprises, by mass, 30-65% of a high temperature resistant adhesive, 1-10% of a nanometer material dispersed slurry, 5-20% of a scale filler, 1-5% of a sheet-shaped nanometer material, 5-30% of a heat resistant anticorrosive pigment, 0.5-5% of an anti-settling agent, and 0-50% of water. The graphene coating material is prepared using a special preparation method, homogenization effect is better, and storage is stable; the graphene coating material is excellent in high temperature resistance, is compact, possesses excellent corrosion resistance in corrosive atmosphere, and good adhesion on metal substrate; and in addition, the construction method of the graphene coating material is simple and rapid, and the engineering cost can be greatly reduced. However, the coating material proposed in such document contains graphene, nano-powders in the range≥10 nm, including niobium and is applied in boilers against corrosion. In addition, the graphene is used to ensure the anticorrosive performance of the material, while the product of the present invention does not require the addition of other nanomaterials for this purpose.

Document CN108822690 discloses a heat-preservation and corrosion-resistant container coating and a heat-preservation and corrosion-resistant coating method of containers. The coating comprises an epoxy zinc-rich primer coating, an epoxy intermediate coating and a polyurethane finish coating, wherein the epoxy intermediate coating is prepared from epoxy resin, an anti-settling additive, a solvent, an organic phase change material, a curing agent and a filler; the polyurethane finish coating is prepared from polyurethane resin, carboxypropyl methyl cellulose, a polyphenol compound, sodium phytate and chitosan. The coating provided by the invention is excellent in corrosion-resistant effect and heat preservation effect; in particular, the unilateral corrosion expansion value of the coating is only 3 mm in a 7, 200-hour unilateral corrosion expansion experiment. However, the coating proposed in such document deals with a paint system. The product of the present invention does not need to be used in a paint system. Anti-corrosion performance is maintained even with a single coat of paint. Although application in a multi-layer paint system can improve anti-corrosion protection, it makes the process much more expensive when compared to a single-layer system.

Document CN106519899 discloses anticorrosive nanopaint prepared from graphene, superconducting elements and rare earth elements. The anticorrosive nanopaint is prepared from components in percentage by mass as follows: 8.0%-12.0% of titanium, 8.0%-12.0% of zinc, 8.0%-12.0% of the graphene and the balance of epoxy resin. Metal elements with superhigh anticorrosive performance are selected from known superconducting elements and rare earth elements and produced into 10-20 nanometers to be bound with the graphene, the epoxy resin is taken as a medium, and the anticorrosive nanopaint with excellent physical performance and chemical performance as well as a cathode protection function is formed through combination. However, the anticorrosive nanopaint proposed in such document uses niobium in amounts of 8-12%, associated with graphene. In addition, the text does not contain specific information that could be correlated to the present invention and provides little information on how anti-corrosion performance has been proven.

Document entitled “Estudo das Propriedades da Tinta Epóxi-Nb2O5 Aplicada na Indústria Química” seeks to evaluate the properties of epoxy paint based on niobium, besides compare the epoxy-Nb2O5 paint with a high-performance commercial paint that is used in industry. For that reason, tests as ultra-micro hardness, Pull Off, accelerated corrosion tests, Salt Spray and humidity chamber were performed. Moreover, tests as total immersion and electrochemical impedance spectroscopy were done. The coatings were tested aiming simulate severe environments using H2SO4 solutions in 20% (m/v) and 40% (m/v) concentrations and a solution of NaCl in 3.5% (m/v) concentration. The ones based on Nb2O5 with thickness of 100 μm presented better results on mechanical tests, even though the ones with thickness of 300 μm presented better performance on corrosion tests. The tests also showed that the samples coated with epoxy-Nb2O5 paint exhibited superior behavior against corrosion than the epoxy commercial paint. However, such document has no similarity with the present invention due to the fact that the epoxy paint is applied in a high film thickness. Still, the smallest layer tested was 100 micrometers, while the product of the present invention manages to maintain the anticorrosive performance in much lower layers. Furthermore, this document does not mention the % of niobium added to the mixture.

Document entitled "*Corrosion Resistance of Niobium-Coated Carbon Steel*" studies the effectiveness of niobium coatings for the corrosion protection of carbon Three niobium resins, containing different molar proportions of citric acid: ethylene glycol, were coated separately onto samples of carbon steel (SAE 1020). The niobium layers were obtained by the polymeric precursor method (Pechini). Potentiodynamic polarization curves (anodic and cathodic) and electrochemical impedance spectroscopy were used to evaluate the corrosion resistance of the niobium-coated carbon steel samples in a 0.5 mol L−1 NaCl electrolyte solution. X-ray diffraction analysis of the niobium layers showed that they are composed of the niobates: NbO, NbO2 and Fe0.998Nb0.002. Surface observation by scanning electron microscopy revealed a uniformly deposited niobium coating on the surface. The electrochemical results showed that niobium was effective in the corrosion protection of the carbon steel substrate. The results also suggested that niobium can be coated onto the substrate to form a layer with advantageous corrosion properties. However, in addition to the fact that such document does not mention the use of the coating associated with epoxy, the need for a calcination step to form the niobium film is also reported, which is not suitable for the field of organic coatings application.

Document entitled "Evaluation of the anticorrosive behavior of epoxy-Nb2O5 paint in high temperatures submitted to the environment with sulfuric acid" has the purpose to evaluate the corrosion resistance of epoxy-Nb2O5 paint in acid atmosphere and high temperatures. For comparison, samples of SAE1020 carbon steel were coated with an epoxy-Nb2O5 paint and an epoxy commercial paint. The samples were partially immersed for 720 h and 1440 h in 40% (v/v) H2SO4 solution at temperatures of 25 °C, 60 °C, and 80 °C. The degradation analysis, mechanical characterization, and electrochemical measurements of the samples were carried out after immersion period. The coatings were characterized by scanning electron microscopy. Electrochemical impedance spectroscopy was used to evaluate the electrochemical behavior. Results showed the epoxy-Nb2O5 paint was less blistering, cracked, flaked, and rusted than the commercial epoxy paint samples. However, it was important to note that the increase in temperature led to the degradation of epoxy-Nb2O5 paint. The addition of temperature was probably responsible for the degradation of epoxy resin over the immersion time. Additionally, the application layer of the proposed epoxy coating is 300 micrometers, much higher than the technology of the present invention. In addition, the comparison made in this document uses a commercial epoxy paint applied with 200 microns. Therefore, there is a barrier protection factor that possibly influenced the results, since a higher layer coating tends to provide greater protection to the substrate, when comparing similar coatings. The study also fails to mention the solvency base of the proposed paint. The product of the present invention is water soluble, which is also a benefit, as already mentioned.

Thus, the product proposed in the present invention comprises a water-soluble paint, without the presence of toxic solvents, containing nanoparticles of niobium pentoxide in its composition. The addition of these nanomaterials allowed the preparation of a high-performance anticorrosive coating, even when applied in low layers and with a single coat, with a focus on painting auto parts, such as brake discs, brake drums and drum blocks. For this type of application, currently available on the market are paints with inferior anticorrosive performance or that require a larger application layer to have a similar performance to the product of the present invention, which leads to lower yields during paint application. Other technologies, such as e-coat, require more complex and expensive application and maintenance processes.

BRIEF DESCRIPTION OF THE INVENTION

Figure 1:
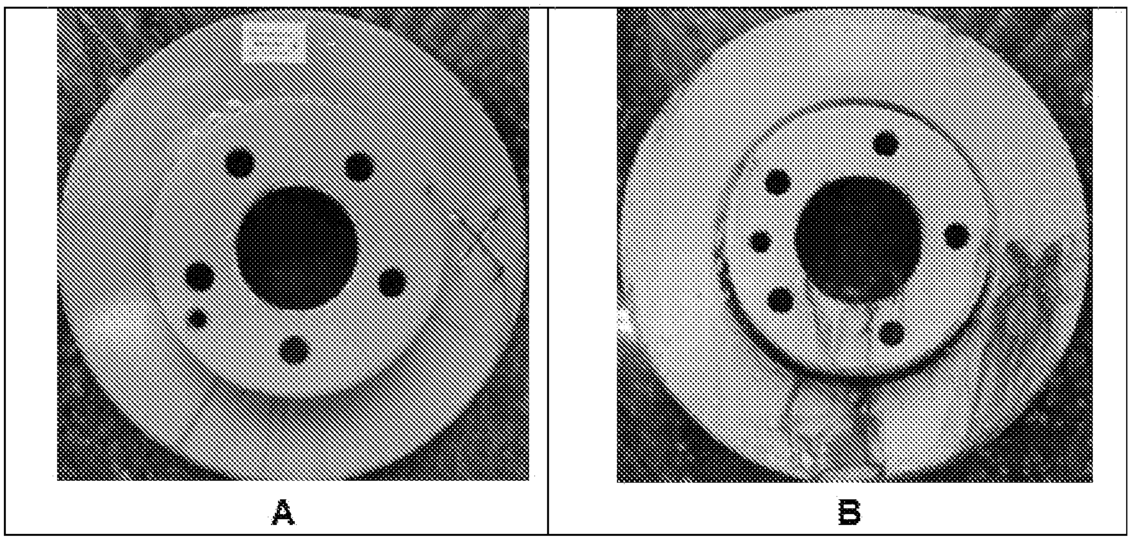
FIG. 1 shows brake disc after 1000 hours of exposure to neutral salt spray, wherein in (A) with proposed formulation where corrosion and blistering were found only in unpainted edge areas and in the scribed area; and in (B) with water-soluble paint without the addition of niobium pentoxide nanoparticles.
Figure 2:
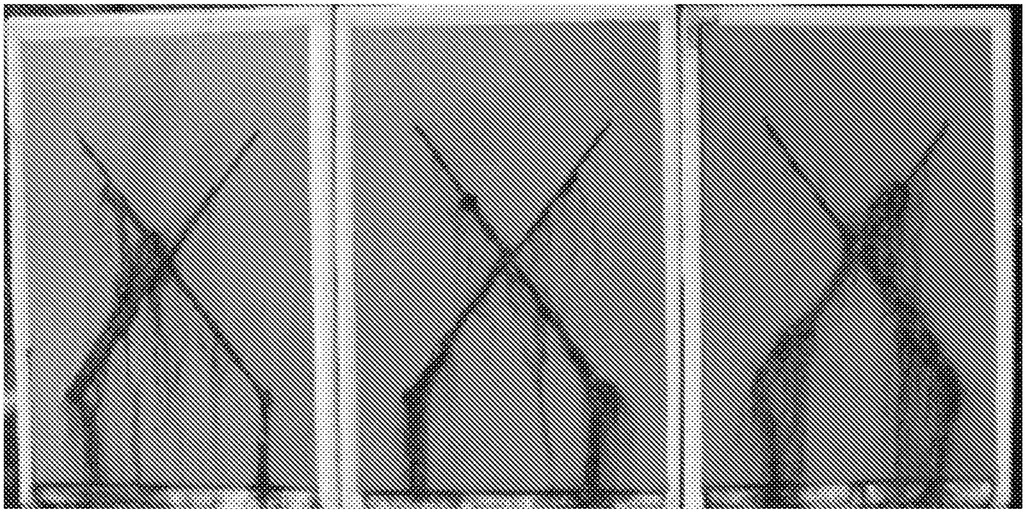
FIG. 2 shows carbon steel panels after 1000 hours of exposure to neutral salt spray (proposed coating formulation), where corrosion points were verified only in the scribed area.

The present invention is intended to propose a water-soluble epoxy paint coating formulation, wherein the addition of niobium oxide nanoparticles allowed the development of a coating with high anticorrosive performance, applied in low film thickness and with a single coat. The present coating is used for application on metallic substrates, focusing on auto parts of vehicles in general, preferably brake discs, drum blocks and brake drums.

DETAILED DESCRIPTION OF THE INVENTION

The present invention refers to a water-soluble epoxy paint coating for application on metallic substrates, focusing on auto parts of vehicles in general, preferably brake discs, drum blocks and brake drums. The coating provides high anti-corrosive protection to the substrate, a property improved with the addition of the nanomaterial. Such coating has the formulation comprising the components A and B, wherein the mixing ratio of the components is 4A×1B.

The component A is consisted of the following:

35-50%, preferably 42% of Bisphenol A epoxy resin (1);

0.1-0.5%, preferably 0.3% of Epoxy-silane adhesion promoter additive (2);

2-3%, preferably 2.5% of Glycol Ether Solvent/Coalescent (3);
0.5-1%, preferably 0.8% of Additive dispersion and wetting copolymer (4);
0.1-0.5%, preferably 0.3% of Antifoam additive with polysiloxanes (5);
0.3-0.8%, preferably 0.5% of Thickener Nonionic Additive Polymer (6);
31-45% of fillers, pigments, and optionally color concentrates, of which:
4-6%, preferably 5% of titanium dioxide pigment (7);
0.3-0.8%, preferably 0.5% of carbon black pigment (8);
15-20%, preferably 17% of barium sulfate pigment (9);
8-12%, preferably 10% of aluminum silicate pigment (10);
4-5%, preferably 4.5% of Pigment based on strontium phosphosilicate (11); and
0-1%, preferably 0.5% of Color concentrate (17);
0.5-1%, preferably 0.8% of Silica-based matting additive (12);
10-15%, preferably 12% of Water (13);
0.2-0.6%, preferably 0.5% of Wetting Additive Polyether Siloxane (14);
0.5-1%, preferably 0.8% of Amine salts-based flash rust inhibitor additive (15);
1.5-2.5%, preferably 2.0% of Sodium Nitrite Solution (16);
0.01-0.05%, preferably 0.03% of Niobium pentoxide in water (20%) (18);

The component B is consisted of the following:
90-96%, preferably 92% of Polyamine based curing agent (19);
2-3%, preferably 2.5% of Flash rust inhibitor additive (20);
2-7%, preferably 5.5% of Water (21).

Below are some possibilities of raw materials for components A and B of the proposed formulation:

Resin:

Epoxy resins compatible with water-soluble base, in liquid, solid or solution state. Preferably bisphenol A epoxy.

Epoxy curing agents preferably used based on polyamines or polyamides.

Nanoparticles:

Niobium oxide (monoxide, dioxide or pentoxide) at the nanoscale (0.5-500 nm), in powder form, suspended or dispersed in liquid, preferably niobium pentoxide dispersed in water, in a concentration greater than 5%.

They can be functionalized with chemical groups, doped with metallic components or undergo another form of treatment in order to optimize the performance of the coating.

Pigments and Fillers:

They may contain from micro to nanoscale particles, and may be present in a natural, synthetic and/or functionalized state. They may have organic or inorganic origin.

Inorganic pigments include metallic oxides (mainly aluminum, iron, titanium, zinc, barium, copper and silicon, but not restricted to these only) and salts (such as sulphates, carbonates, silicates, titanates, chromates and phosphates, but not restricted to these). Other inorganic pigments that can be used include metallic zinc and aluminum, or a mixture thereof, added in the range of 5-30% in the formulation.

Organic pigments may contain azo compounds, phthalocyanine and carbon blacks, not restricted to these.

Concentrated bases of pigments can also be used for color assignment and/or adjustments.

Solvents and Thinners:

Main solvent: water (preferably distilled or deionized).

Other solvents compatible with the formulation can be added, such as alcohols, ketones, glycols, glycol ethers, alcohol esters, not restricted to these. Mixture of solvents can also be applied. For example, mixtures of water and butyl glycol are common in water-soluble products. Butylglycol is also commonly used to clean equipment before and after the production of water-soluble paints. Other common mixtures are ethanol, combinations of water and texanol (alcohol ester), and water. In the formulation of the product, glycol ether and water were used, which could have been pre-mixed before entering the paint homogenization process, without impacting the final product.

The paint can be thinned with one of the solvents mentioned above (or a mixture thereof) for the application, in 0-25% (volume).

Additives:

Several additives can be added the formulation with anti-corrosive, anti-foaming, dispersing, surfactant or humectant, rheological or thixotropic, adhesion promoting, drying, plasticizing, leveling functions, among others.

The addition of niobium oxide nanoparticles allowed the development of a coating with high anticorrosive performance, applied in low film thickness and with a single coat. As it is water-based, it also does not contain toxic organic solvents in its composition.

Paint Preparation:

The production process of the proposed paint resembles the traditional processes already known in the art. The general description of the process is shown below:

Component A:

1. Homogenization

Into a stainless-steel container, the following liquid ingredients are added: epoxy resin (1), adhesion promoter additive (2), solvent/coalescent (3), additives (4) to (6). The resin must be added first, while for the others the order of addition is not so relevant.

The homogenization of these components begins, in a mechanical stirrer at 100-500 rpm. Then, the nanomaterial (16) is added to the mixture, still at 100-500 rpm.

Part of the water solvent (13) (preferably less than 10% of the maximum 10-15% of the formula) can be added at this stage to aid homogenization.

2. Dispersion

The solid raw materials (pigments (7) to (11)) are added, gradually increasing the rotation to 500-1000 rpm (to promote particle dispersion). Additive (12) is also added. The order of addition is not so relevant, but the addition must be in parts to avoid agglomeration of solids and loss of the degree of dispersion (paint fineness).

Dispersion promotes an increase in the temperature of the mixture, which must be controlled to a maximum of 60 °C.

The mixture is kept stirring until the desired degree of dispersion (fineness) is reached.

This process is known as direct dispersion. An additional milling operation can be added to further increase the degree of dispersion of the mixture.

3. Completion

After dispersion, the other liquid components are added: water (13) and components (14) to (16), under rotation of 100-500 rpm.

4. Adjustments

If necessary, color concentrates (17) may be added for color adjustments and/or water or other compatible solvent (or diluent) may be added for viscosity adjustment.

Component B:

1. Homogenization

Process similar to the production of component A. Since all the raw materials are liquid, only the homogenization step is necessary.

Technical Characteristics of Paint after Preparation:

Gloss at 60°: 20-60, preferably 30 gloss units (gloss measured on a paint-applied and cured steel plate).

Viscosity (mixture A+B) Brookfield type: 60-100 UK, preferably 85 UK.

Degree of dispersion (fineness) of component A: >=4 Hegman, preferably 6 Hegman.

Paint Application:

The paint is applied to a metallic substrate, such as steel, cast iron and aluminum, preferably steel, or in other types of substrates, as needed.

Before applying the paint, the substrate surface needs a treatment, i.e., a surface cleaning (with degreasing with organic solvent and/or chemical cleaning with acids/bases, if necessary), phosphating, abrasive blasting or treatments with hand and mechanical tools (such as sandpaper, brushes, scrapers, among others).

After preparing the substrate surface, the paint is prepared by mixing components A and B. It may contain dilution (maximum of 25% in volume), according to the solvents mentioned above. The dilution must be done after mixing components A and B.

The paint may be applied through some methods: by spray gun (conventional spray, airless, etc.), dipping, brush and roller methods, but not restricted to these only, and preferably conventional spray gun.

Dry film thickness: below 100 μm, preferably between 30 and 40 μm, and applied in a single coat. It may include more coats or retouchings. Layers that are too high can lead to paint sagging.

The paint can be used as a primer, intermediate or finishing, in combination with other paints, such as other epoxy paints, epoxy esters, acrylics, alkyds, vinyls, polyesters, polyurethanes, silicones, zinc rich paints or hybrid systems.

The painted surface must be kept at room or oven temperature (in this case, preferably below 120 °C) to be cured.

Paint Performance Assessment Tests:

Preparation of Samples for Neutral Salt Spray Tests, Adhesion and Resistance to Saturated Humidity Rectangular carbon steel panels and brake discs samples were cleaned and degreased with an organic solvent prior to paint application. The application was carried out via conventional spray gun. The paint was diluted 10% with water, with Brookfield viscosity of 69 UK or Ford Cup 4 of 85 seconds after dilution. Oven curing conditions of 20 minutes at 100° C. For the heat resistance with accelerated corrosion and visual appearance tests, only carbon steel panels were used. For the neutral salt spray and saturated humidity tests, an "X" cut was made in each specimen, piercing the paint film until the substrate is reached. All panel tests were performed in triplicate. The tests with brake discs were performed in duplicate.

Neutral salt spray (according to ASTM B117 or similar)—1000 hours without blistering, pitting and mean creepage from scribe≤1 mm.

ASTM D1654 (Mean creepage from scribe: rating number>8)

ASTM D714 (Blistering: rating number 10)

ASTM D610 (Rust grade: 10)

Adhesion (according to ASTM D3359 or similar)—no detachment of the film after cutting and tape testing (X0Y0 or 5B, for ASTM D3359).

Resistance to saturated humidity (according to ASTM D2247 or similar)—500 hours without blistering, pitting and mean creepage from scribe≤1 mm.

ASTM D1654 (Mean creepage from scribe: rating number>8)

ASTM D714 (Blistering: rating number 10)

ASTM D610 (Rust grade: 10)

Visual appearance. Verification of the absence of defects in the paint film applied to the panel, such as pinholing, flaking and solvent popping. No visible defects were observed after application.

Heat resistance with accelerated corrosion-no blistering and pitting.

ASTM D714 (Blistering: rating number 10)

ASTM D610 (Rust grade: 10)

Assay:

22 hours at 300 °C. Test carried out in a muffle furnace. Three panels were placed in the muffle for 22 h at 300 °C. After removing the muffle, the specimens were cooled to room temperature.

2 h in salt spray (ASTM B 117 or similar). Procedure similar to the previously mentioned neutral salt spray test, except that no cuts were made in the specimens. After cooling to room temperature, the samples were placed in a neutral salt spray chamber for 2 hours. After this time, they were washed with water to remove sodium chloride and left to dry at room temperature.

6 hours at 0 °C. After drying the samples, they were placed in a climatic chamber at 0 °C for 6 h. Afterwards, they were removed and kept at room temperature for approximately 30 minutes before evaluating corrosion and blistering points.

The invention claimed is:

1. A paint coating formulation comprising the following components:

component A, wherein the component A comprises:

35-50% of an epoxy resin (1);

0.1-0.5% of epoxy-silane adhesion promoter additive (2);

2-3% of solvents and thinners (3);

0.5-1% of additive dispersion and wetting copolymer (4);

0.1-0.5% of antifoam additive with polysiloxanes (5);

0.3-0.8% of thickener nonionic additive polymer (6);

31-45% of fillers, pigments, and optionally color concentrates, wherein the pigments are selected from the group consisting of 4-6% titanium dioxide pigment (7), 0.3-0.8% carbon black pigment (8), 15-20% barium sulfate pigment (9), 8-12% aluminum silicate pigment (10), 4-5% strontium phosphosilicate pigment (11), and 0-1% of color concentrate (17);

0.5-1% of silica-based matting additive (12);

10-15% of water (13);

0.2-0.6% of wetting additive polyether siloxane (14);

0.5-1% of amine salts-based flash rust inhibitor additive (15);

1.5-2.5% of sodium nitrite solution (16);

0.01-0.05% of nioobim oxide nanoparticles (18), wherein all percentages recited for component A are weight percentages based on total weight of component A;

component B, wherein the component B comprises:

90-96% of epoxy curing agents (19);

2-3% of flash rust inhibitor additive (20);

2-7% of water (21), wherein all percentages recited for component B are weight percentages based on total weight of component B;

wherein a mixing ratio of the components A and B is 4A×1B.

2. The paint coating formulation according to claim 1, wherein the epoxy resin (1) is selected from the group consisting of epoxy resins compatible with water-soluble base, in liquid, solid or solution state.

3. The paint coating formulation according to claim 2, wherein the epoxy curing agents are based on polyamines or polyamides.

4. The paint coating formulation according to claim 2, wherein the epoxy resin (1) is bisphenol A epoxy.

5. The paint coating formulation according to claim 1, wherein the niobium oxide nanoparticles comprise one or more of niobium monoxide, niobium dioxide and niobium pentoxide, have a particle size of 0.5-500 nm, and are in powder form, suspended form or dispersed in liquid form.

6. The paint coating formulation according to claim 5, wherein the niobium oxide nanoparticles are niobium pentoxide dispersed in water, in a concentration greater than 5%.

7. The paint coating formulation according to claim 1, wherein the pigments, fillers and optionally color concentrates are of organic and inorganic origin and are present in a natural, synthetic and/or functionalized state.

8. The paint coating formulation according to claim 7, wherein the inorganic pigments and fillers comprise metallic oxides of one or more of aluminum, iron, titanium, zinc, barium, copper and silicon; one or more salts selected from sulphates, carbonates, silicates, titanates, chromates, and phosphates; metallic zinc; aluminum; or a mixture thereof.

9. The paint coating formulation according to claim 7, wherein the organic pigments are selected from the group consisting of azo compounds, phthalocyanine and carbon blacks.

10. The paint coating formulation according to claim 1, wherein the solvents and thinners are selected from the group consisting of distilled or deionized water, alcohols, ketones, glycols, glycol ethers, alcohol esters, and a mixture thereof.

11. The paint coating formulation according to claim 1, wherein one or more additives present in the formulation provide one or more anti-corrosive, anti-foaming, dispersing, surfactant, humectant, rheological, thixotropic, adhesion promoting, drying, plasticizing and leveling functions.

12. The paint coating formulation according to claim 1, wherein the formulation has anticorrosive performance, applies in low thickness of a maximum of 100 micrometers, and with a single coat.

13. The paint coating formulation according to claim 12, wherein the formulation applies in thickness of between 30 and 40 micrometers, and with a single coat.

14. The paint coating formulation according to claim 1, wherein the formulation has a viscosity Brookfield type of 60 to 100 UK, component A has a degree of dispersion greater than or equal to 4 Hegman, and a cured coating formed from the formulation presents 20 to 60 gloss units.

15. A method of using the paint coating formulation as defined in claim 1 comprising applying the coating formulation on metallic substrates selected from the group consisting of auto parts of vehicles, brake discs, drum blocks and brake drums.

16. A method of treating a substrate surface comprising:

preparing the substrate surface by one or more treatments selected from the group consisting of surface cleaning, phosphating, abrasive blasting, treatment with hand tools, and treatment with mechanical tools, wherein the mechanical tools comprise one or more of sandpaper, brushes and scrapers; and applying the paint coating formulation according to claim 1 to the prepared substrate surface.

* * * * *